(12) United States Patent  (10) Patent No.: US 7,014,316 B2
Asakura  (45) Date of Patent: Mar. 21, 2006

(54) OPTICAL LENS WITH MARKING AND MANUFACTURING METHOD THEREOF

(75) Inventor: Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 09/776,761

(22) Filed: Feb. 6, 2001

(65) Prior Publication Data

US 2001/0017733 A1  Aug. 30, 2001

(30) Foreign Application Priority Data

Feb. 10, 2000  (JP) .............................. 2000-033634
Aug. 8, 2000  (JP) .............................. 2000-239297

(51) Int. Cl.
  *G02C 7/02*  (2006.01)
(52) U.S. Cl. ....................................... 351/165; 351/159
(58) Field of Classification Search ................ 351/159, 351/165, 177; 359/738, 739
See application file for complete search history.

(56) References Cited

U.S. PATENT DOCUMENTS

| | | |
|---|---|---|
| 4,039,827 A | 8/1977 | Zdrok et al. |
| 4,145,125 A | 3/1979 | Chika ............................ 351/165 |
| 4,193,671 A | 3/1980 | Erickson et al. |
| 4,196,967 A * | 4/1980 | Ohnishi et al. .............. 359/738 |
| 4,525,044 A | 6/1985 | Bauman |
| 4,619,504 A | 10/1986 | Daniels et al. |
| 4,989,960 A * | 2/1991 | Thomas ......................... 359/738 |
| 5,244,470 A | 9/1993 | Onda et al. |
| 5,249,082 A | 9/1993 | Newman |
| 5,307,740 A | 5/1994 | Yamamoto et al. |
| 5,452,027 A * | 9/1995 | Tylec ............................ 351/46 |
| 5,568,322 A | 10/1996 | Azami et al. |
| 5,664,244 A | 9/1997 | Yamamura et al. |
| 5,870,229 A | 2/1999 | Tsuchida |
| 5,886,332 A | 3/1999 | Plesko |
| 6,104,545 A | 8/2000 | Tsuchida |
| 6,233,098 B1 | 5/2001 | Plesko |
| 6,504,657 B1 | 1/2003 | Ono et al. |

FOREIGN PATENT DOCUMENTS

| | | |
|---|---|---|
| EP | 0 472 496 | 2/1992 |
| JP | 53-27435 | 3/1978 |
| JP | 61-223820 | 10/1986 |
| JP | 2-120787 | 5/1990 |
| JP | 2-142814 | 12/1990 |
| JP | 5-96034 | 12/1993 |
| JP | 8-281819 | 10/1996 |
| JP | 8-315385 | 10/1996 |
| JP | 09-049966 | 2/1997 |
| JP | 10039114 | 2/1998 |
| JP | 10-311904 | 11/1998 |
| JP | 11-221830 | 8/1999 |
| WO | WO 9743731 | 11/1997 |

OTHER PUBLICATIONS

Written Opinion for Applications No. SG 200100659-2, (form APO/SG/408); mailed Sep. 24, 2002.

(Continued)

*Primary Examiner*—Hung Xuan Dang
(74) *Attorney, Agent, or Firm*—Smith, Gambrell & Russell, LLP

(57) ABSTRACT

An optical lens, has a marking entirely or partially outside an effective area of the lens to distinguish between surfaces of the lens.

24 Claims, 17 Drawing Sheets

OTHER PUBLICATIONS

Australian Patent Office Search Report for Application No. SG 200100659-2, (form APO/SG/210).
Patent Abstract of Japan, Publication No. 08-106002, Publication Date Apr. 23, 1996.
European Search Report issued in connection with EP 01 10 2912, dated Feb. 16, 2005.

* cited by examiner

3

1

12
13
1

OPTICAL LENS WITH MARKING AND MANUFACTURING METHOD THEREOF

BACKGROUND OF THE INVENTION

1. Field of the Invention

The present invention relates to an optical lens, which is used for a component or the like of an optical instrument or information equipment, and a manufacturing method thereof and further concerns an optical device using the optical lens. Moreover, for example, the present invention relates to a lens, a lens manufacturing method, a lens manufacturing device, an optical device, an optical pickup device, an optical communication device, an optical sensor device, and a laser beam printer device.

2. Related Art of the Invention

In recent years, a lens has been widely used for a pickup of an optical communication disk, an optical communication module, a pickup of an optical disk device, a laser printer, a variety of optical sensors and so on as well as a camera and a telescope. These devices have been downsized with improved capability year after year, and even an optical lens of a several-millimeter or smaller has been realized (for example, a lens of 2-millimeter or smaller is available).

Further, at the time of assembling a variety of optical devices and components, a worker determines an installing direction of an optical lens according to a visual check on a curvature, a shape of the lens surface and so on, and the worker manually marks the surface before assembling and mounting.

Additionally, upon inspecting a lens, optical characteristics such as aberration, resolution, and transmittance are measured. However, as mentioned above, a lens has been recently reduced in size (for example, a lens of 2-millimeter or smaller is available), so that it has been increasingly difficult to inspect a lens to make final determination on the quality of the lens.

In many cases, a visual inspection for flaws and contamination has been conducted as a lens inspection. Such an inspection includes a visual check or image processing conducted on the entire surface of a lens.

However, in case of mounting a lens on a variety of optical devices, it has been more difficult to determine an installation surface of a lens because an optical lens is smaller with a fine shape, resulting in poor workability, and a step of marking for determination is additionally required, thereby increasing the manufacturing cost. Further, marking becomes more difficult as a lens is smaller.

The objective of the present invention is, in order to solve the above-mentioned problem, to provide an optical lens allowing a worker to readily determine an installation surface of the lens, a manufacturing method of the optical lens, and an optical device using the optical lens.

Further, in the case of a visual inspection by observation, the quality is determined by inspecting the entire surface of a lens. Thus, a lens having no problem about its capability is determined as a defective piece because of flaws or dust adhered to a region outside an effective area, even though the region is not fundamentally used. Particularly, due to returned products from a customer making such an incorrect determination, a yield may be reduced. Moreover, in a visual inspection by image processing, a lens surface is shiny, so that lighting and reflection from the surroundings make it difficult to determine the quality. Consequently, an image processing algorithm for determination may become complicated.

Furthermore, when accuracy of determination is increased, an inspecting step requires more time and work, thereby increasing a unit price of a lens.

As described above, it has not been possible to provide a high-quality lens with low manufacturing cost while maintaining a preferable yield.

SUMMARY OF THE INVENTION

Considering the above conventional problem, the present invention is devised to provide a lens, a lens manufacturing method, a lens manufacturing device, an optical device, an optical pickup device, an optical communication device, an optical sensor device, and a laser beam printer device that supply a high-quality lens with low manufacturing cost while maintaining a preferable yield.

The $1^{st}$ invention of the present invention is an optical lens, comprising a marking entirely or partially outside an effective area of said lens to distinguish between surfaces of said lens.

The optical lens described in a $1^{st}$ present invention makes it possible to assemble and mount an optical device with ease as compared with a conventional art, to downsize a device, and to reduce the manufacturing cost.

The $2^{nd}$ invention of the present invention is the optical lens as set forth in $1^{st}$ invention, wherein said lens is a coupling lens.

The $3^{rd}$ invention of the present invention is the optical lens as set forth in $1^{st}$ or $2^{nd}$ inventions, wherein said lens surface has a coating film and said marking is formed by using said coating film.

The $4^{th}$ invention of the present invention is the optical lens as set forth in $3^{rd}$ invention, wherein said coating film is not provided at least partially outside the effective area of said lens, and said marking refers to a part on which said coating film is not provided.

The $5^{th}$ invention of the present invention is the optical lens as set forth in $1^{st}$ or $2^{nd}$ inventions, wherein said marking is unevenly formed outside the effective area of said lens.

The $6^{th}$ invention of the present invention is the optical lens as set forth in $1^{st}$ or $2^{nd}$ inventions, wherein said marking is made of a printed matter.

The $7^{th}$ invention of the present invention is the optical lens as set forth in $1^{st}$ or $2^{nd}$ inventions, wherein said marking is made of a coating matter.

The $8^{th}$ invention of the present invention is an optical lens, comprising a coating film on one of two surfaces of said lens.

The $9^{th}$ invention of the present invention is the optical lens as set forth in $8^{th}$ invention, wherein said optical lens is a coupling lens.

The $10^{th}$ invention of the present invention is a manufacturing method of an optical lens, comprising a step of entirely or partially forming a marking outside an effective area of said lens to distinguish between surfaces of said lens.

The $11^{th}$ invention of the present invention is the manufacturing method of the optical lens as set forth in $10^{th}$ invention, wherein said lens is a coupling lens.

The $12^{th}$ invention of the present invention is the manufacturing method of the optical lens as set forth in $10^{th}$ or $11^{th}$ inventions, wherein said lens surface has a coating film and said marking is formed by using said coating film.

The $13^{th}$ invention of the present invention is the manufacturing method of the optical lens as set forth in $12^{th}$ invention, wherein said coating film is not provided at least partially outside the effective area of said lens, and said marking refers to a part on which said coating film is not provided.

According to a manufacturing method of the optical lens that is described in a thirteenth present invention, the marking can be readily formed by using a part of the coating film as a mask, thereby reducing the manufacturing cost of the optical lens.

The 14$^{th}$ invention of the present invention is the manufacturing method of the optical lens as set forth in 10$^{th}$ or 11$^{th}$ inventions, wherein said marking is unevenly formed outside the effective area of said lens by using a mold.

According to a manufacturing method of the optical lens that is described in a 14$^{th}$ present invention, the marking can be readily formed by using a mold of the lens, thereby reducing the manufacturing cost of the optical lens.

The 15$^{th}$ invention of the present invention is the manufacturing method of the optical lens as set forth in 10$^{th}$ or 11$^{th}$ inventions, wherein said marking is formed by printing.

According to a manufacturing method of the optical lens that is described in a 15$^{th}$ present invention, the marking can be readily formed by printing, thereby reducing the manufacturing cost of the optical lens.

The 16$^{th}$ invention of the present invention is the manufacturing method of the optical lens as set forth in 10$^{th}$ or 11$^{th}$ inventions, wherein said marking is formed by coating.

According to a manufacturing method of the optical lens that is described in a 16$^{th}$ present invention, the marking can be readily formed by coating, thereby reducing the manufacturing cost of the optical lens.

The 17$^{th}$ invention of the present invention is a manufacturing method of an optical lens, comprising a step of forming a coating film on one of two surfaces.

The 18$^{th}$ invention of the present invention is the manufacturing method of the optical lens as set forth in 17$^{th}$ invention, wherein said optical lens is a coupling lens.

The 19$^{th}$ invention of the present invention is an optical device, comprising any one of optical lenses as set forth in 1$^{st}$ to 9$^{th}$ inventions.

An optical device according to a 19$^{th}$ present invention makes it possible to improve capability and to reduce the cost by using an optical lens described in any one of the first to ninth present inventions.

The 20$^{th}$ invention of the present invention is the optical device as set forth in 19$^{th}$ invention, wherein said optical device is an optical pickup device and said optical lens is used for condensing light on an optical disk, said optical device including a light source for emitting light and an optical element for detecting light reflected on said optical disk.

An optical pickup according to a twentieth present invention makes it possible to improve capability and to reduce the cost by using an optical lens described in any one of the first to ninth present inventions.

The 21$^{st}$ invention of the present invention is the optical device as set forth in 19$^{th}$ invention, wherein said optical device is an optical communication component and said optical lens is used for condensing light, said optical device including a light source for emitting light and an optical fiber.

The 22$^{nd}$ invention of the present invention is the optical device as set forth in 19$^{th}$ invention, wherein said optical device is an optical sensor and said optical lens is used for condensing light, said optical device including an optical element for detecting light condensed by said optical lens.

An optical sensor according to a twenty-second present invention makes it possible to improve capability and to reduce the cost by using an optical lens described in any one of the first to ninth present inventions.

The 23$^{rd}$ invention of the present invention is a lens, comprising a configuration permitting visual discrimination between an inner region and an outer region of effective area of said lens.

The 24$^{th}$ invention of the present invention is the lens as set forth in 23$^{rd}$ invention, wherein said configuration permitting visual discrimination includes a non-shiny surface having no shine as a surface outside the effective area.

The 25$^{th}$ invention of the present invention is the lens as set forth in 23$^{rd}$ invention, wherein said configuration permitting visual discrimination includes a light-absorbing surface for absorbing light as a surface outside the effective area.

The 26$^{th}$ invention of the present invention is the lens as set forth in 23$^{rd}$ invention, wherein said configuration permitting visual discrimination includes a scattering surface for scattering light as a surface outside the effective area.

The 27$^{th}$ invention of the present invention is the lens as set forth in 23$^{rd}$ invention, wherein said configuration permitting visual discrimination includes a pattern surface having a predetermined pattern, as a surface outside the effective area.

The 28$^{th}$ invention of the present invention is the lens as set forth in 27$^{th}$ invention, wherein said predetermined pattern includes any one of a ring, a spiral, and a mesh.

The 29$^{th}$ invention of the present invention is the lens as set forth in 23$^{rd}$ invention, wherein said configuration permitting visual discrimination includes a rough surface as a surface outside said effective area.

The 30$^{th}$ invention of the present invention is a lens manufacturing method, comprising a step of working a surface outside an effective area of a lens so as to permit visual discrimination from a surface inside the effective area.

The 31$^{st}$ invention of the present invention is the lens manufacturing method as set forth in 30$^{th}$ invention, wherein said working refers to applying a coating on the surface outside the effective area.

The 32$^{nd}$ invention of the present invention is the lens manufacturing method as set forth in 30$^{th}$ invention, wherein said working refers to printing the surface outside the effective area.

The 33$^{rd}$ invention of the present invention is the lens manufacturing method as set forth in 30$^{th}$ invention, wherein said working refers to evaporating a coating on the surface outside the effective area.

The 34$^{th}$ invention of the present invention is the lens manufacturing method as set forth in 30$^{th}$ invention, wherein said working refers to crimping a pattern surface having a predetermined pattern onto the surface outside the effective area.

The 35$^{th}$ invention of the present invention is a lens manufacturing method, comprising a step of simultaneously forming a lens and a predetermined pattern by using a mold, which is capable of forming said predetermined pattern on a surface outside an effective area of said lens so as to permit visual discrimination from a surface inside the effective area.

The 36$^{th}$ invention of the present invention is a lens manufacturing device, comprising means of working a surface outside an effective area of a lens so as to permit visual discrimination from a surface inside said effective area.

The 37$^{th}$ invention of the present invention is a lens manufacturing device, comprising means of simultaneously forming a lens and a predetermined pattern by using a mold, which is capable of forming said predetermined pattern on a surface outside an effective area of said lens so as to permit visual discrimination from a surface inside the effective area.

The 38$^{th}$ invention of the present invention is an optical device, comprising a lens as set forth in 23$^{rd}$ invention.

The 39$^{th}$ invention of the present invention is an optical pickup device, comprising a lens as set forth in 23$^{rd}$ invention.

The 40$^{th}$ invention of the present invention is an optical communication device, comprising a lens as set forth in 23$^{rd}$ invention.

The 41$^{st}$ invention of the present invention is an optical sensor device, comprising a lens as set forth in 23$^{rd}$ invention.

The 42$^{nd}$ invention of the present invention is a laser beam printer device, comprising a lens as set forth in 23$^{rd}$ invention.

DESCRIPTION OF SYMBOLS

Figure 1:
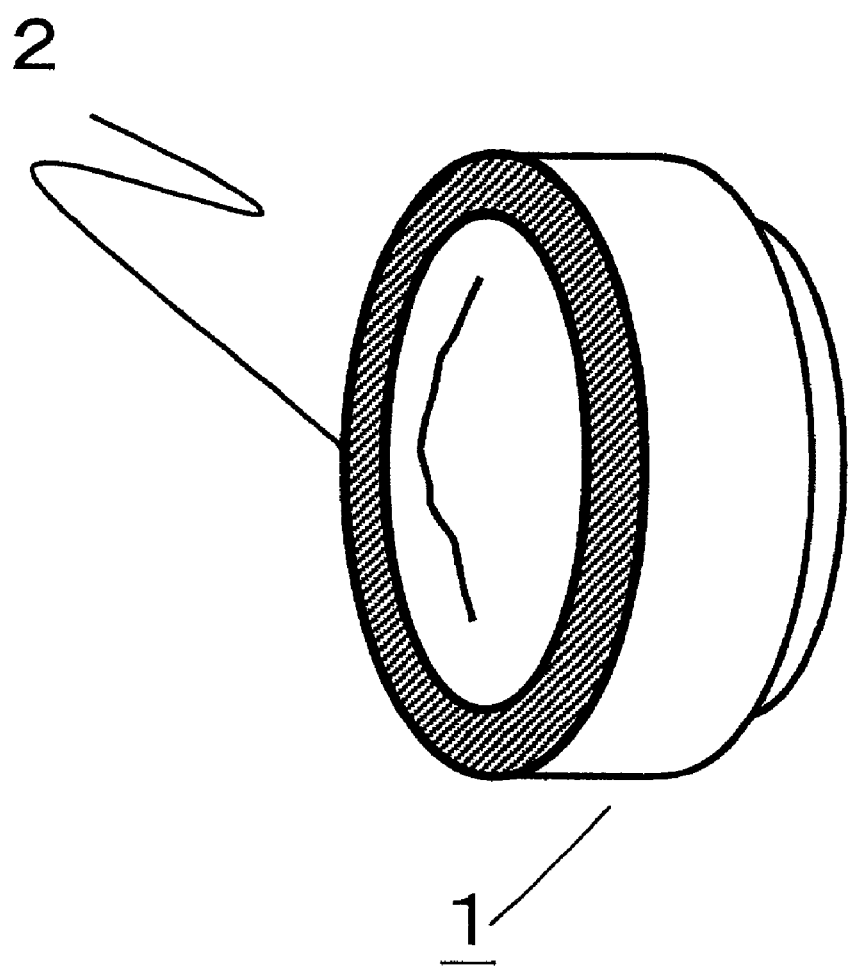
FIG. 1 is a perspective view showing an optical lens according to a first embodiment of the present invention.

1 . . . lens
2 . . . marking
3 . . . evaporation mask
4 . . . mold
5 . . . transparent material
6 . . . cylinder
7 . . . marking work part
8, 12 . . . semiconductor laser
9, 14 . . . light-receiving element
10 . . . beam splitter
11 . . . optical disk
13 . . . optical fiber
101, 101' . . . lens
102, 102' . . . discrimination part
103, 104, 104' . . . mold
105 . . . transparent material
106 . . . cylinder
107 . . . fine pattern
108, 112 . . . semiconductor laser
109 . . . light-receiving element
110 . . . beam splitter
111 . . . optical disk
113 . . . optical fiber
132 . . . mask

PREFERRED EMBODIMENTS OF THE INVENTION

Referring to drawings, the following will describe the embodiments of the present invention.

First Embodiment

First, the following will discuss the configuration of an optical lens according to a first embodiment of the present invention. FIG. 1 shows the optical lens of the first embodiment according to the present invention. As shown in FIG. 1, a marking 2 is formed on a surface of an optical lens 1. Any pattern is applicable as the marking 2 as long as it is simply distinguishable. The examples of the pattern are shown in FIGS. 2B to 2E. A white background other than diagonal lines is a marking. As shown in FIGS. 2B to 2E, a marking is formed entirely or partially outside an effective area of the lens to distinguish between the surfaces of the lens. In this case, any marking is applicable as long as the surface and the back can be distinguished from each other. Further, the optical lens 1 is, for example, 2 millimeters or smaller in size. Moreover, although the present embodiment does not specify the kind of the optical lens 1, the optical lens 1 is a coupling lens or the like.

Incidentally, a marking may be provided using a coating film. For example, a marking may be formed on the coating film provided on the surface of the lens. Or the coating film may not be formed on at least a part of outside an effective area of the lens and the part having no coating film may be used as a marking. Or a marking may be formed with an uneven shape or formed by printing or coating. In short, any marking is acceptable as long as the surface and the back can be distinguished from each other.

Figure 2A:
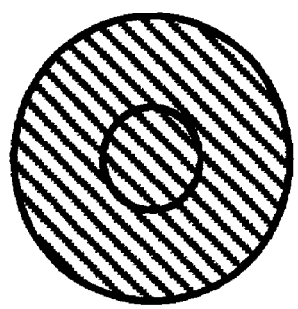
FIGS. 2A to 2E are pattern diagrams showing a marking of the optical lens according to the first embodiment of the present invention.
Figure 2B:
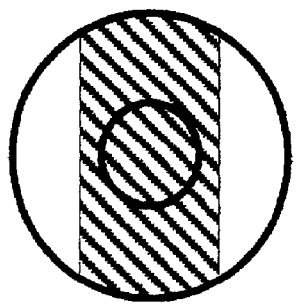
Figure 2C:
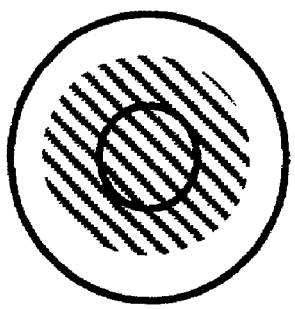
Figure 2D:
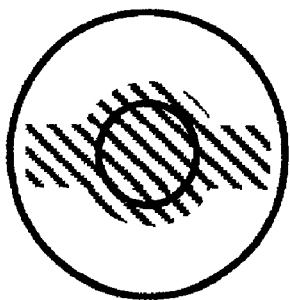
Figure 2E:
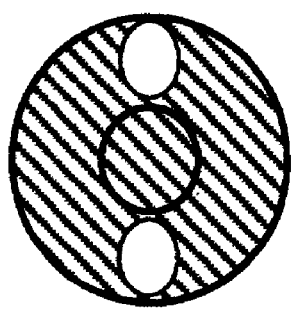

FIG. 2A shows that a coating film is provided entirely on a surface of the optical lens 1. The coating film is not provided on the other surface of the optical lens 1 (not shown). Since one surface has the coating film but the other surface does not, it is possible to readily distinguish between the surface and the back of the optical lens based on the presence or absence of the coating film. Here, a coating film may be or may not be provided on the side of the optical lens.

The following will describe a manufacturing method of the optical lens according to the first embodiment of the present invention.

FIGS. 3A and 3B show an example of the lens manufacturing method for forming a marking. The lens 1 is coated by evaporation to prevent reflection and to provide protection thereon. Here, a coating instrument is covered with an evaporation mask 3. Coating is made on a part of the surface of the lens 1, not substantially entirely on the surface. Hence, the surface of the lens 1 is partially coated so as to act as a marker for distinguishing between the surface and the back. It is therefore possible to form a marking without an increase in conventional steps of manufacturing a lens. Additionally, the lenses illustrated in FIGS. 2B to 2E can be manufactured by changing the shape of the evaporation mask 3.

Figure 3:
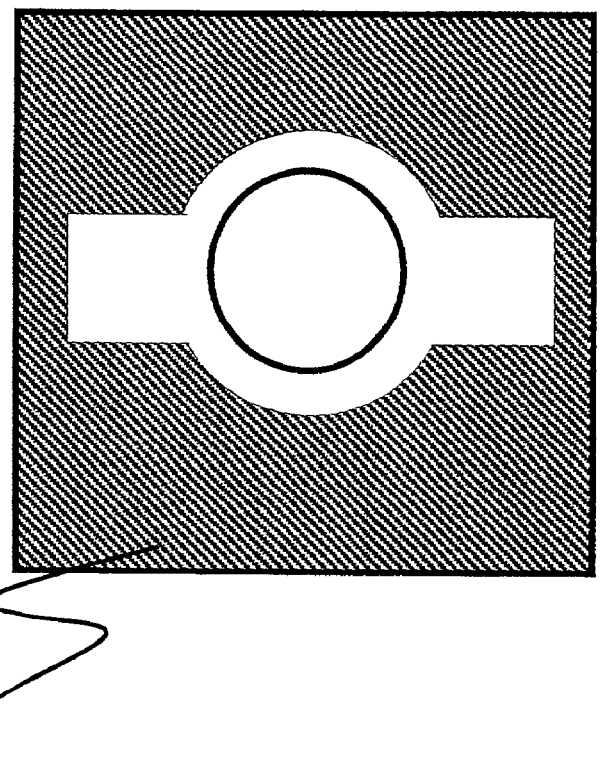
FIGS. 3A to 3B are block diagrams showing a manufacturing method of the optical lens according to the first embodiment of the present invention.
Figure 3:
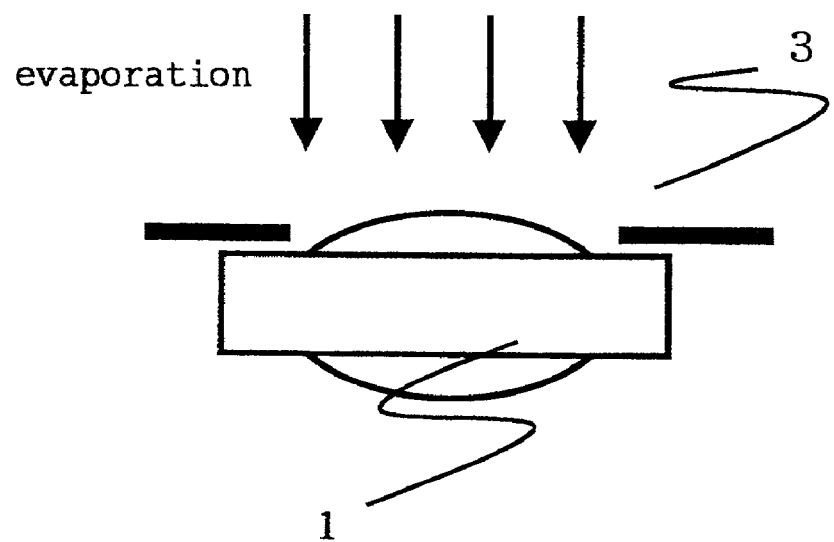

Also, in the case where no evaporation is performed, a marking can be readily formed with a simple step such as screen printing and coating, by reversing a mask pattern of the evaporation mask 3 shown in FIG. 3.

Moreover, in the case where coating is performed by evaporating substantially the entire surface of the lens, a marking can be entirely or partially formed outside the effective area of the lens surface by printing, coating, and so on.

Figure 4:
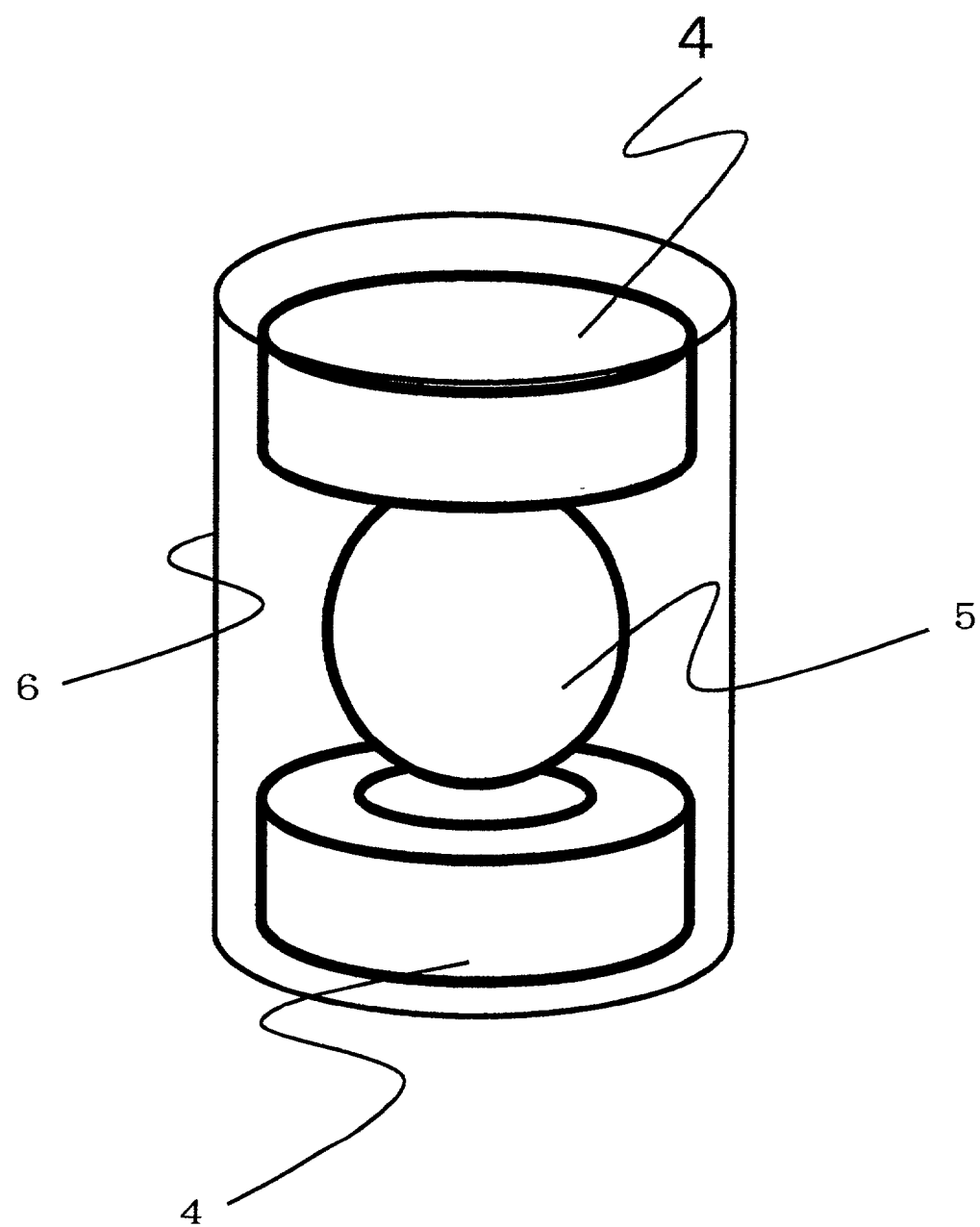
FIG. 4 is a structural drawing showing a mold for working the lens according to the first embodiment of the present invention.
Figure 5:
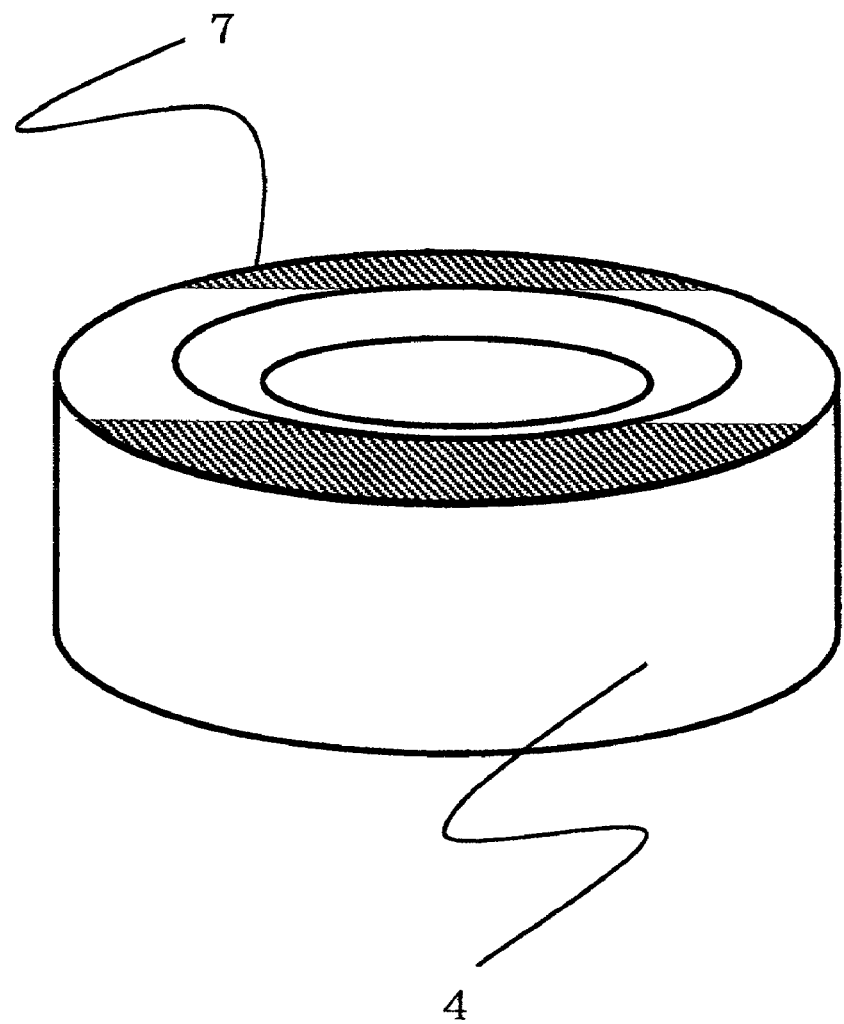
FIG. 5 is a perspective view showing the mold for working the lens according to the first embodiment of the present invention.

Further, as shown in FIG. 4, in case of manufacturing the lens in a molding process, projections and depressions are formed on molds 4 to provide a marking, so that a marking can be provided in the lens formation. FIG. 5 is a perspective view showing the mold 4. Marking work parts 7 for forming a marking are provided partially on an edge or the like of a lens formation surface of the mold 4.

First, a lens is formed by using the mold before forming the marking work parts 7, and evaluation is made on an optical characteristic of the formed lens. Thereafter, post-working is performed on the mold to form a marking as the marking work parts 7, which indicates a direction of aberration and birefringence of the lens. Thus, with the marking, it is possible to adjust a rotating direction of an optical axis such that the best capability of an optical device is achieved upon installation into the device as well as to distinguish between the surface and the back of the lens. It is therefore possible to readily find conditions of installation into the optical device, thereby improving a yield and the capability of the entire device.

Moreover, even in case of manufacturing the optical lens while a coating film is provided on a surface but not on the other surface, it is possible to readily distinguish between the surface and the back of the optical lens based on the presence or absence of a coating film. Here, a coating film may be or may not be provided on the side of the optical lens.

Additionally, the lens of the present invention is not particularly limited on the material and may be made of a material such as glass and plastic.

The following will describe an optical device using the optical lens of the present invention according to the first embodiment of the present invention.

Figure 6:
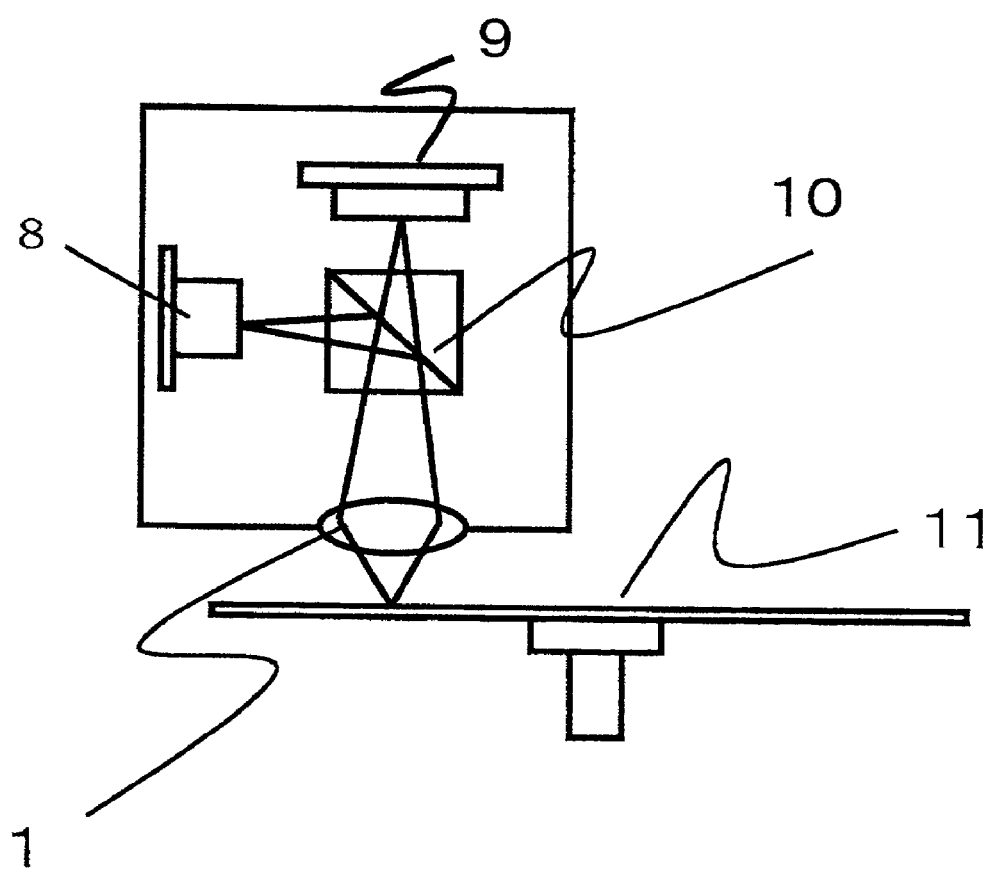
FIG. 6 is a structural drawing showing an optical pickup according to the first embodiment of the present invention.

FIG. 6 shows an example of an optical pickup using the lens of the present invention. Light from a semiconductor laser 8 is emitted to an optical disk 11 through the lens 1, reflected light with pit information of the optical disk 11 is emitted to a light-receiving element 9, and a signal is read. A marking is provided on the lens 1, and a coating film is provided on the surface but is not provided on the back. Hence, the surface and the back can be readily distinguished from each other. Consequently, it is possible to readily install the lens 1 such that the optimum capability can be achieved for the optical pickup. It is therefore possible to improve the yield with preferable capability of the optical pickup, resulting in lower cost.

Figure 7:
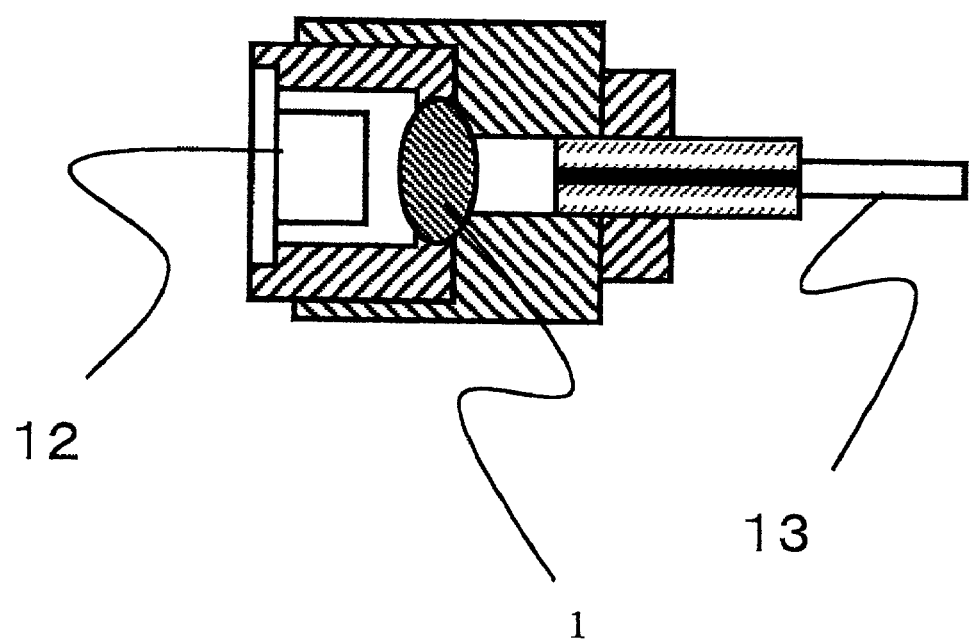
FIG. 7 is a structural drawing showing an optical communication component according to the first embodiment of the present invention.

FIG. 7 shows an example of an optical communication component using the lens of the present invention. Light from a semiconductor laser 12 is coupled to an optical fiber 13 through the lens 1 and is transmitted. A marking is provided on the lens 1, and a coating film is provided on the surface but is not provided on the back. Hence, the surface and the back can be readily distinguished from each other. Consequently, it is possible to readily install the lens 1 such that the optimum capability can be achieved for the optical communication component. It is therefore possible to improve the yield with preferable capability of the optical communication component, resulting in lower cost.

Figure 8:
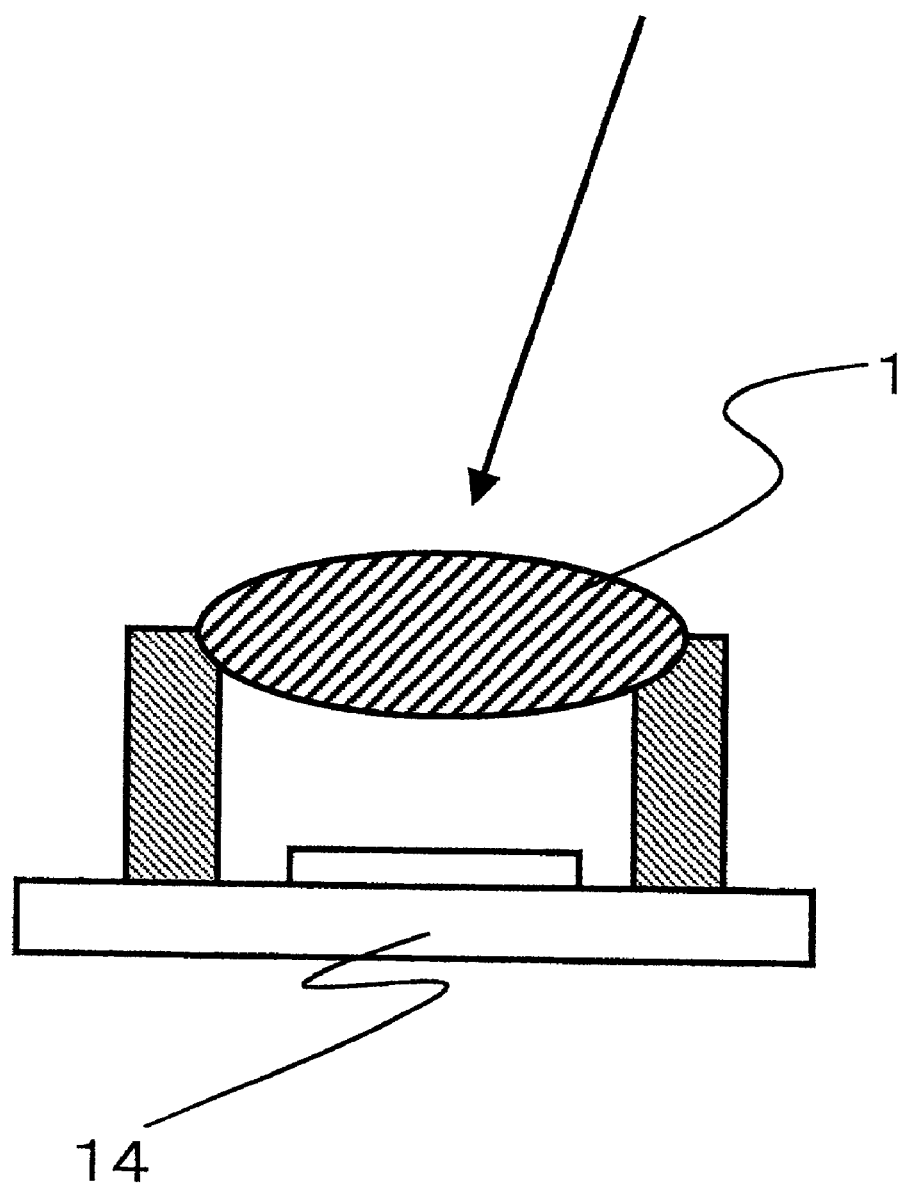
FIG. 8 is a structural drawing showing an optical sensor according to the first embodiment of the present invention.

FIG. 8 shows an example of an optical sensor using the lens of the present invention. An optical signal is emitted to a light-receiving element 14 through the lens 1 and sensing is carried out. A marking is provided on the lens 1, and a coating film is provided on the surface but is not provided on the back. Hence, the surface and the back can be readily distinguished from each other. Consequently, it is possible to readily install the lens 1 such that the optimum capability can be achieved for the optical sensor. It is therefore possible to improve the yield with preferable capability of the optical sensor, resulting in lower cost.

Second Embodiment

Figure 9:
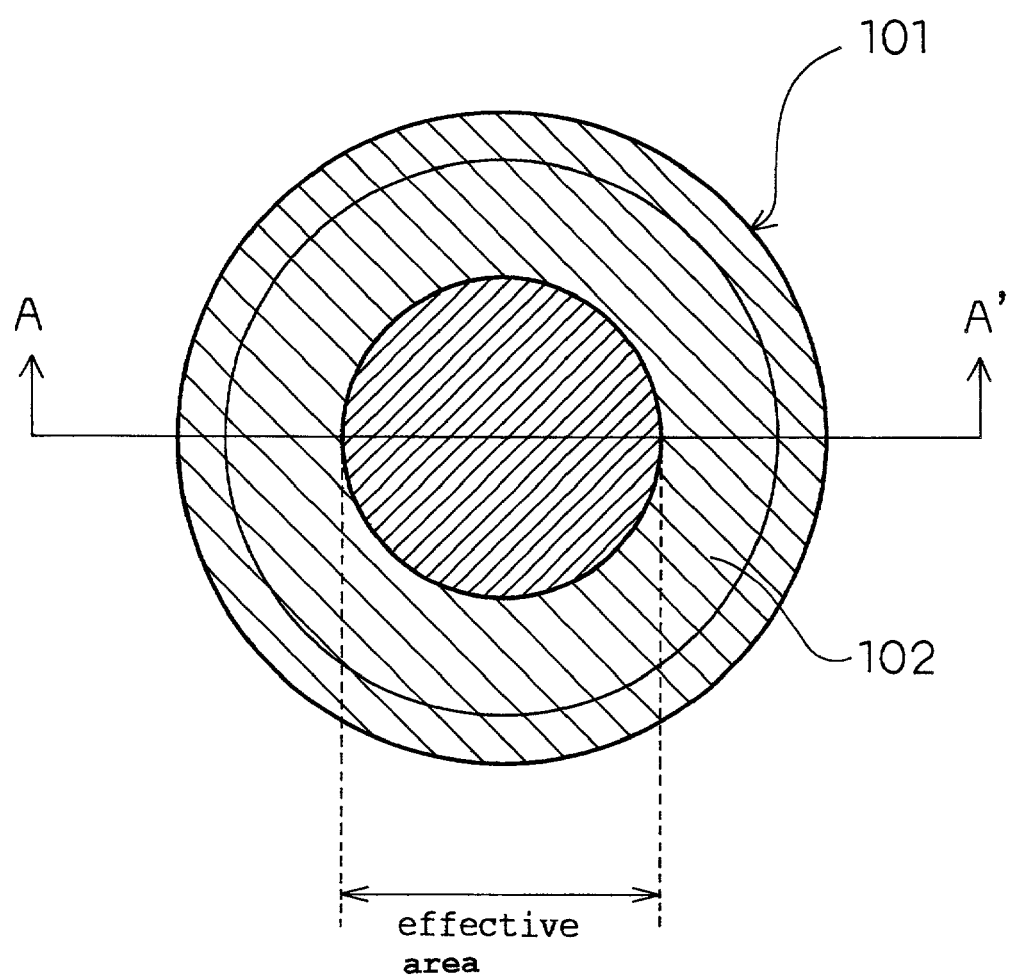
FIG. 9 is a plan view showing a lens according to a second embodiment of the present invention.
Figure 10:
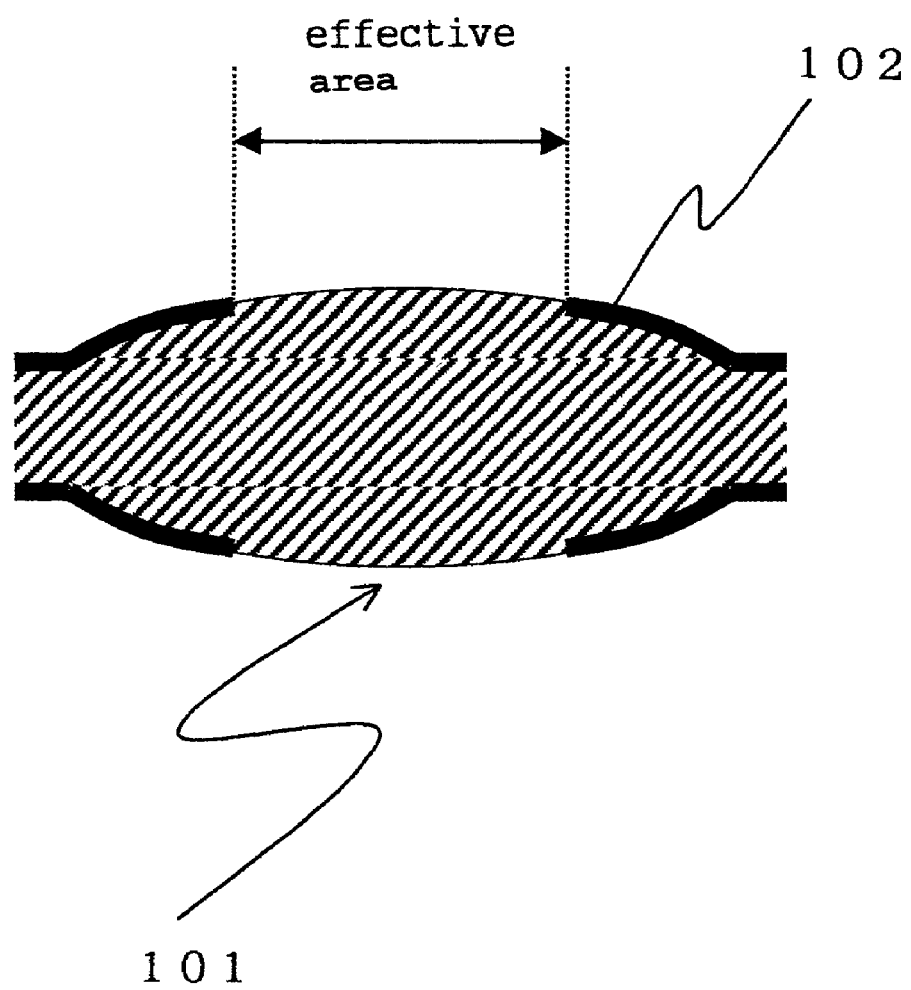
FIG. 10 is a sectional drawing taken along A–A' line of the lens shown in FIG. 9 according to the second embodiment of the present invention.

First, referring to FIGS. 9 and 10, the configuration of a lens 101 will be discussed according to a second embodiment. Here, FIG. 9 is a plan view showing the lens 101, and FIG. 10 is a sectional view taken along A–A' line of the lens 101 shown in FIG. 9.

The lens 101 has an effective area for transmitting light and an outer region of the effective area. The surface of the outer region is visually distinguishable from that of the inner region. Here, the lens 101 has a size of, for example, 2 millimeters or smaller.

As described above, on both surfaces of the lens 101, the outer regions of the effective area are subjected to surface treatment for visual discrimination so as to form a discrimination part 102.

In order to provide lenses with a preferable yield, it has been conventionally considered that flaws and dust adhered to a region outside the effective area are not tolerable, even though the region is not fundamentally used. However, the inventor clearly proved from a completely different point of view that the influence of flaws and dust on the lens capability can be eliminated by performing surface treatment for visual discrimination on the surface outside the effective area. This idea is far beyond the conventional way of thinking. Therefore, returned products from the customer are expected to dramatically decrease, the products being determined as defective products even though the capability does not have any problems. Consequently, it is possible to provide lenses with a preferable yield.

Here, in the above-mentioned embodiment, the surface treatment for discrimination is carried out on both surfaces of the lens. However, the surface treatment is not particularly limited, so that the treatment may be performed on one of the surfaces. In short, the lens of the present invention may be configured in any way as long as the inner and outer regions of the effective area can be distinguished from each other. For example, the lens may have a ring mark on the effective area.

Third Embodiment

Mainly referring to FIGS. 11 and 12, the configuration and operation of a lens manufacturing device will be described according to the present embodiment. Here, the following will discuss an embodiment of a lens manufacturing method according to the present invention as well as the configuration and operation of the lens manufacturing device according to the present embodiment.

The lens manufacturing device of the present embodiment is provided with means of evaporating a coating for visual discrimination between a surface inside an effective area and a surface outside the effective area of a lens 101'.

While discussing the operation of the above-mentioned lens manufacturing device, the following will describe an embodiment of the lens manufacturing method for each of (1) a molding step and (2) an evaporating step.

Figure 12:
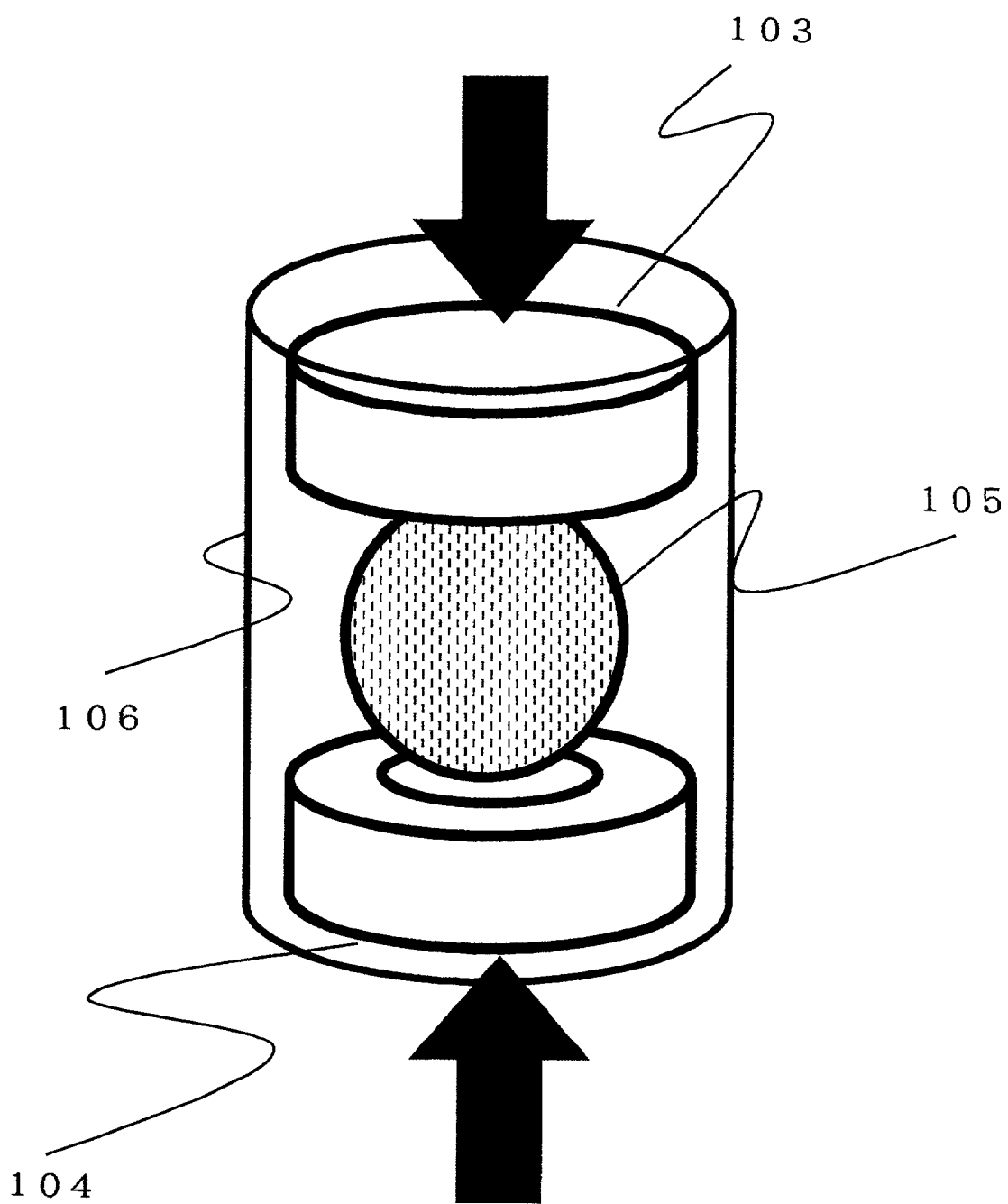
FIG. 12 is an explanatory drawing showing a molding step according to the third and fourth embodiments of the present invention.

(1) molding step; as shown in FIG. 12 which is an explanatory drawing showing the molding step, a lens transparent material (hereinafter, simply referred to as a transparent material) 105 is disposed into a cylinder 106 and is heated and softened at 500 to 600° C. And then, the lens transparent material 105 is pressed by molds 103 and 104 in directions of arrows and is molded. Here, the mold 103 is an upper mold and the mold 104 is a lower mold.

Figure 11:
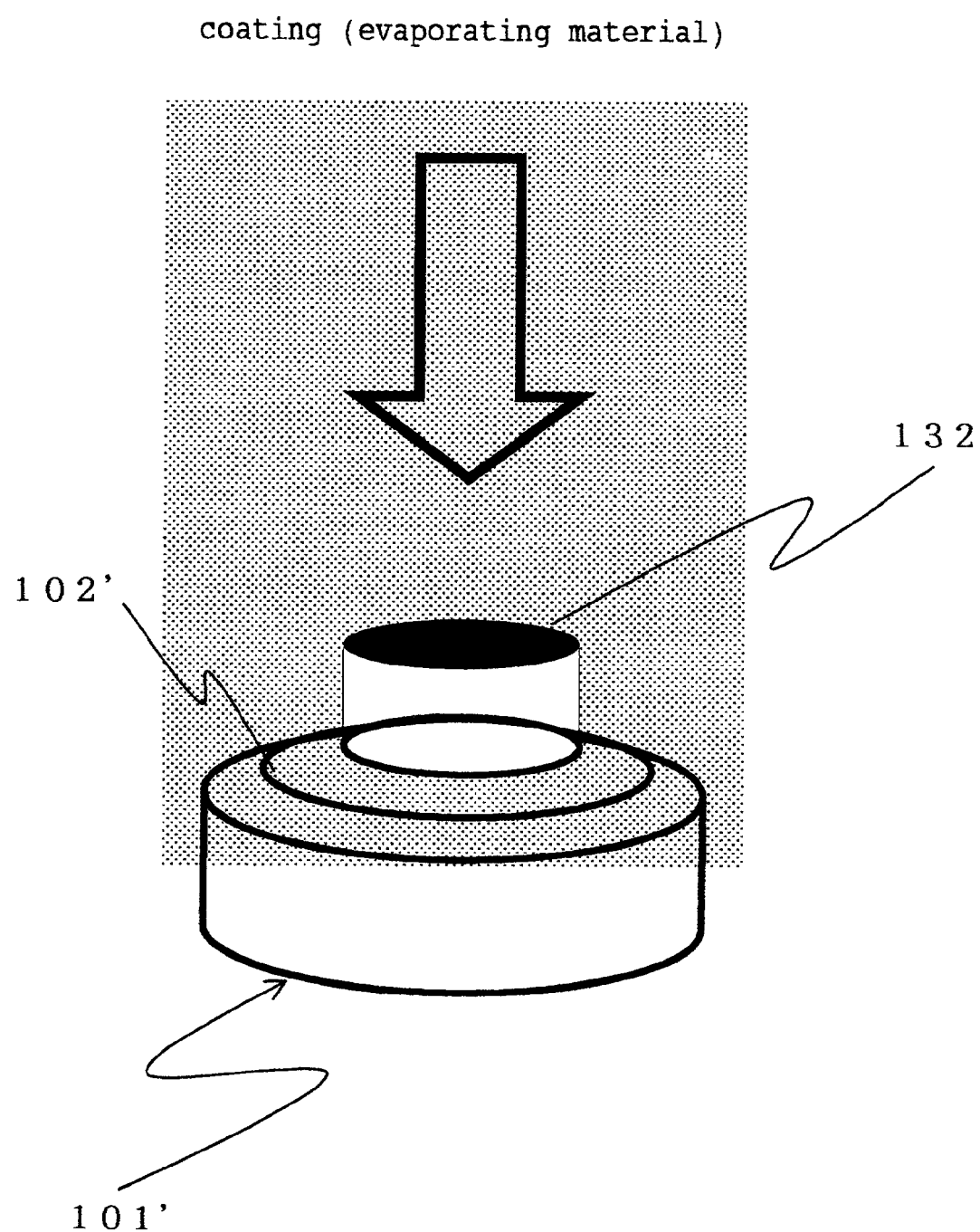
FIG. 11 is an explanatory drawing showing an evaporating step according to a third embodiment of the present invention.

(2) evaporating step; as shown in FIG. 11 which is an explanatory drawing showing the evaporating step, in order to form a discrimination part 102' of the lens 101', a coating for absorbing and scattering light is sprayed in the directions of the arrows on the surface of the lens, which has been molded while the inner region of the effective area is masked. Here, reference numerical 132 denotes a mask for shielding the effective area to prevent the adherence of a coating on the effective area.

Also, a film made of a metal and a dielectric material may be evaporated onto the outer region of the effective area of the lens. Further, the lens 101' and the mask 132 are not in contact with each other in the above-mentioned embodiment (See FIG. 11). However, the arrangement is not particularly limited, so that they may be brought into contact with each other.

Moreover, a light-absorbing configuration or a light-scattering configuration may be formed by screen printing and attaching a sheet.

Fourth Embodiment

Next, referring to FIGS. 12 and 13, the configuration and operation of a lens manufacturing device will be described according to the present embodiment. The following will discuss an embodiment of a lens manufacturing method according to the present invention as well as the configuration and operation of the lens manufacturing device according to the present embodiment.

In order to visually discriminate between a surface inside an effective area and a surface outside the effective area of a lens, the lens manufacturing device of the present embodiment is provided with a means of simultaneously forming the lens and a finely patterned surface by using a mold 104'. The mold 104' makes it possible to form a fine pattern on the surface outside the effective area of the lens.

Namely, a method for discriminating between the lens effective areas is not limited to the formation of the light-scattering configuration and the light-absorbing configuration, which are described in the third embodiment. Thus, pattern formation or coloring for permitting discrimination is also applicable. To be specific, a rough surface or a finely patterned surface may be formed by directly working a lens surface so as to form the scattering configuration and a surface configuration for discrimination.

Figure 13:
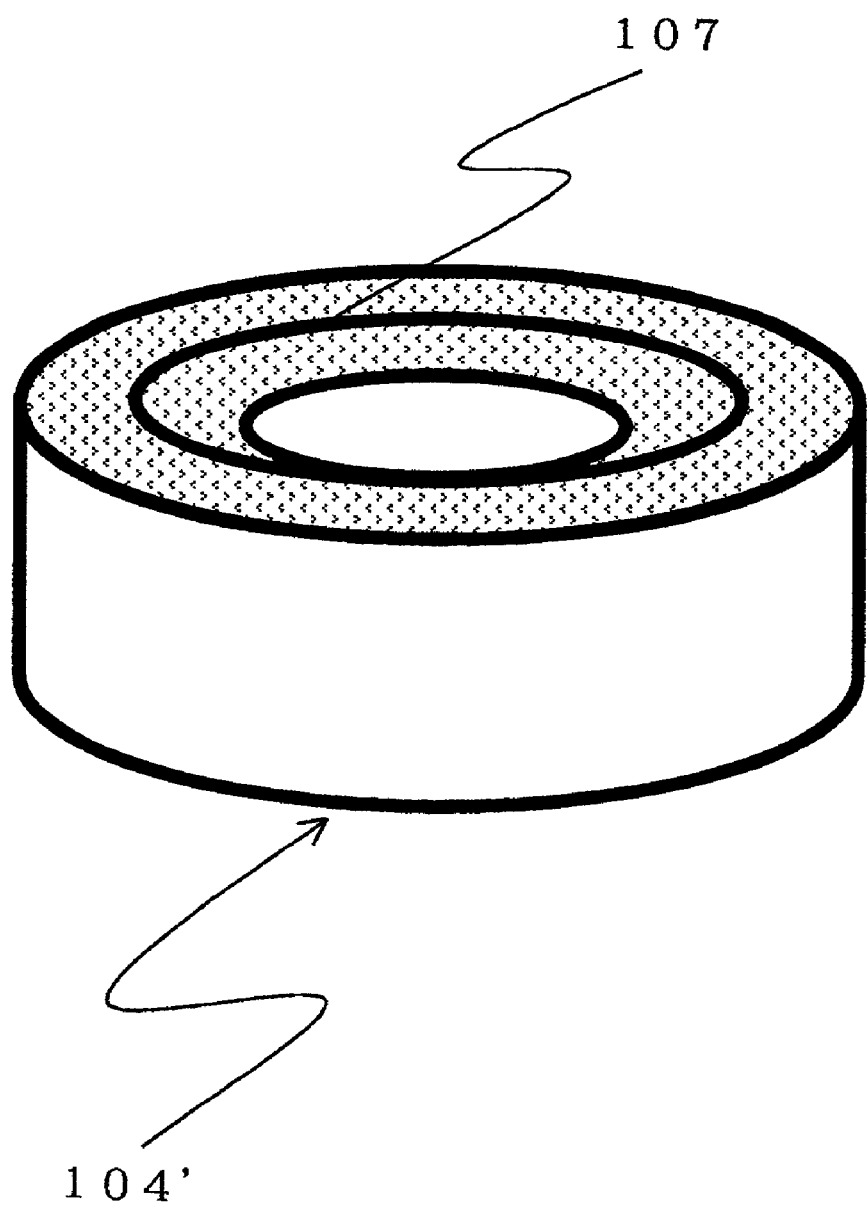
FIG. 13 is a perspective view showing a mold 104 having a fine pattern 107 according to the fourth embodiment of the present invention.

For instance, considering that a lens used for an optical pickup and optical communication is mostly manufactured by molding, the lens manufacturing device of the present embodiment simultaneously forms the lens and the finely patterned surface by using the mold 104', which is illustrated in FIG. 13. Here, FIG. 13 is a perspective view showing the mold 104' having a fine pattern 107.

A lens transparent material 105 (see FIG. 12) is disposed into a cylinder 106 (see FIG. 12), is pressed by a mold 103 (see FIG. 12) and a mold 104' (see FIG. 13), and is molded into a lens. One of the surfaces of the lens is subjected to surface treatment for discrimination.

As mentioned above, since the fine pattern 107 (see FIG. 13) is formed on the mold 104', it is possible to readily transfer and manufacture a discrimination part on the surface outside the effective area of the lens, simultaneously with the lens formation. The discrimination part serves as a fine pattern surface. Here, the working for forming the fine pattern 107 (see FIG. 13) is preferably conducted by cutting, etching, and discharging. Surely, the fine pattern surface is preferably formed by cutting and grinding a shape such as a ring (i.e., a ring swath), a spiral and a mesh during the cutting and grinding for manufacturing the mold.

Additionally, the visual inspection of the present invention is not limited to a direct inspection conducted by a worker. Thus, it is surely possible to adopt a discriminating inspection by image processing using a camera and so on. This is because the inner region and outer region of the effective area can be clearly distinguished from each other, so that even image processing makes it possible to readily distinguish between determined regions and detect flows.

Further, the lens of the present invention is not particularly limited as long as it is made of a material such as glass and plastic with permeability at a working wavelength.

The above-mentioned embodiment described the lens of the present invention. Referring to FIGS. 14 to 17, the following will discuss an example of an optical device of the present invention that uses the lens of the present invention.

Figure 14:
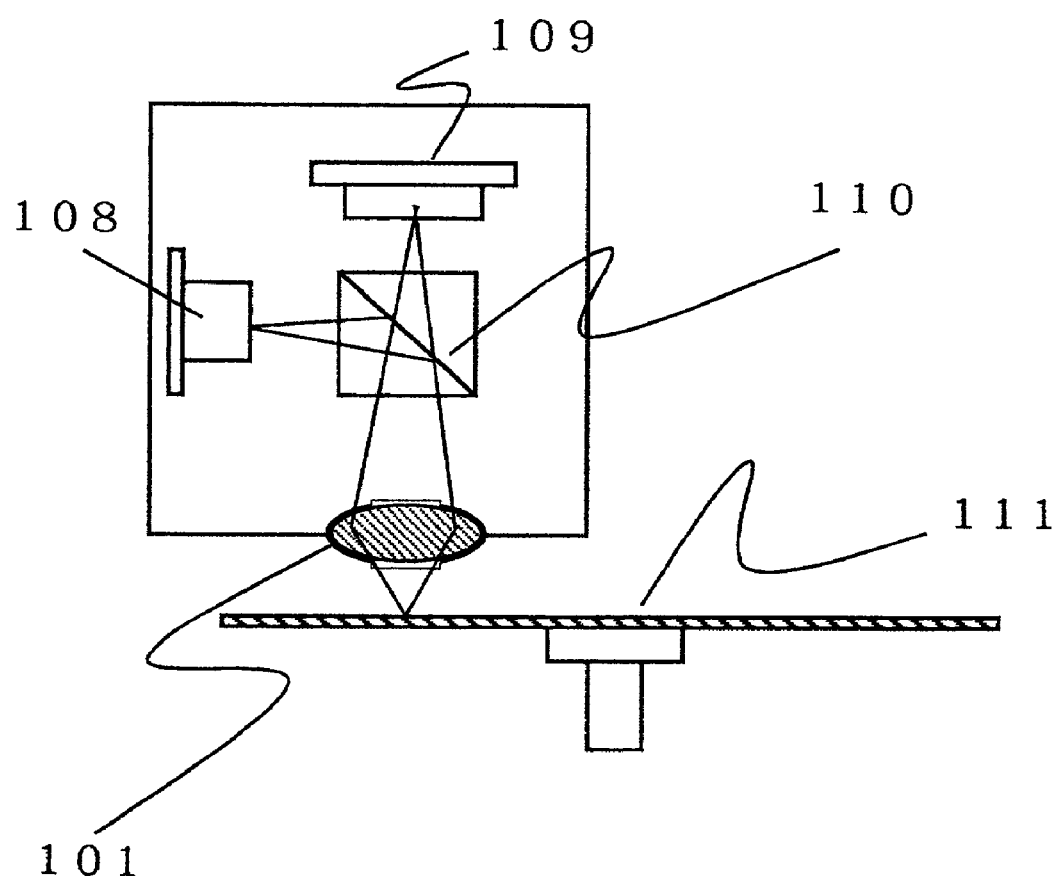
FIG. 14 is a structural drawing showing an optical pickup according to an embodiment of the present invention.

For example, FIG. 14 is a structural drawing showing an optical pickup device using the lens of the present invention. Light from a semiconductor laser 108 is emitted to an optical disk 111 through a lens 101, reflected light with pit information of the optical disk 111 is emitted to a light-receiving element 109, and a signal is read.

Figure 15:
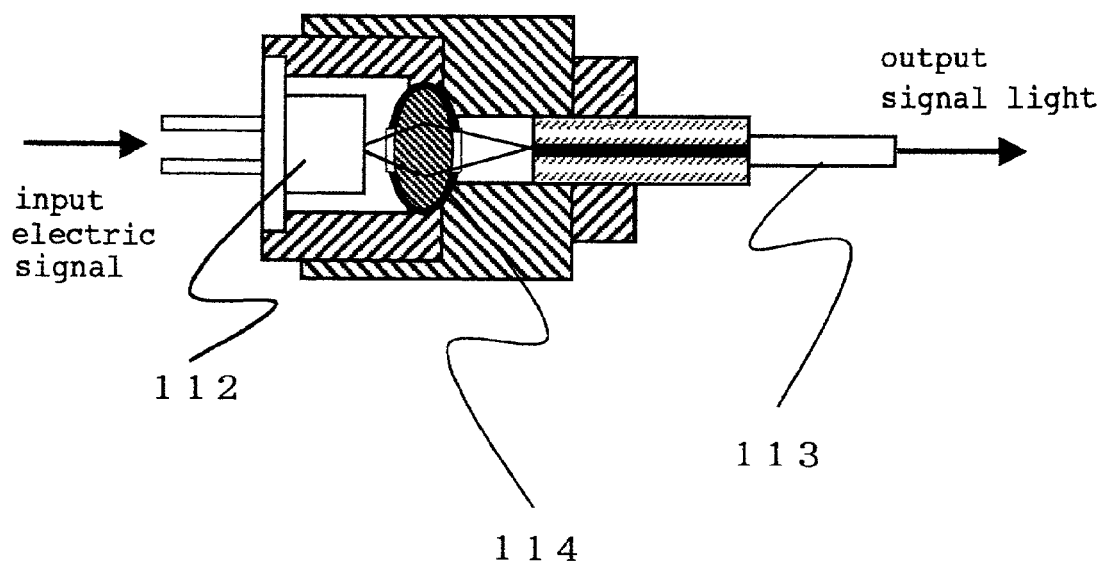
FIG. 15 is a structural drawing showing an optical communication component according to an embodiment of the present invention.

Moreover, FIG. 15 is a structural drawing showing an optical communication component using the lens of the present invention. Light emitted from a semiconductor laser 112 is coupled to an optical fiber through the lens 101 and is transmitted.

Figure 16:
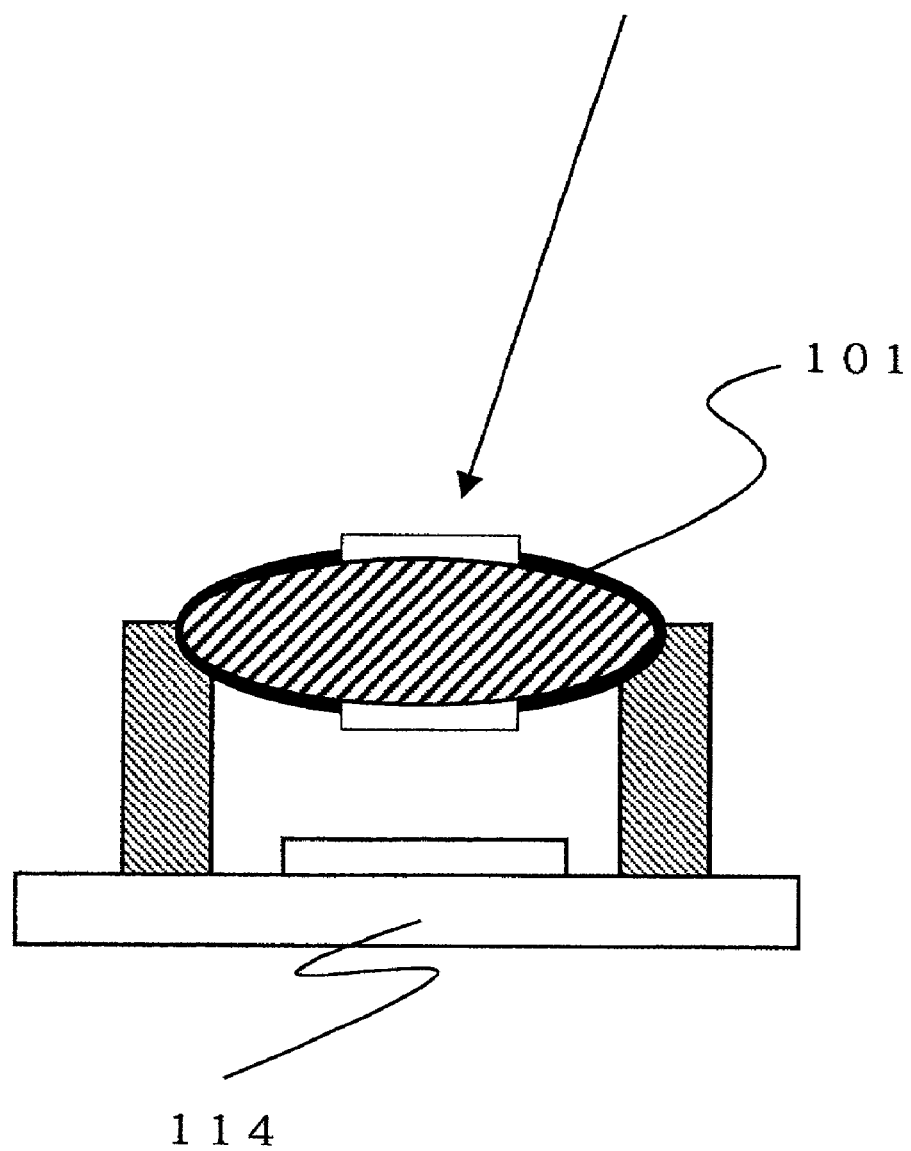
FIG. 16 is a structural drawing showing an optical sensor according to an embodiment of the present invention.

Additionally, FIG. 16 is a structural drawing showing an optical sensor using the lens of the present invention. A light signal is emitted to a light-receiving element 114 through the lens 101 and sensing is carried out.

Figure 17:
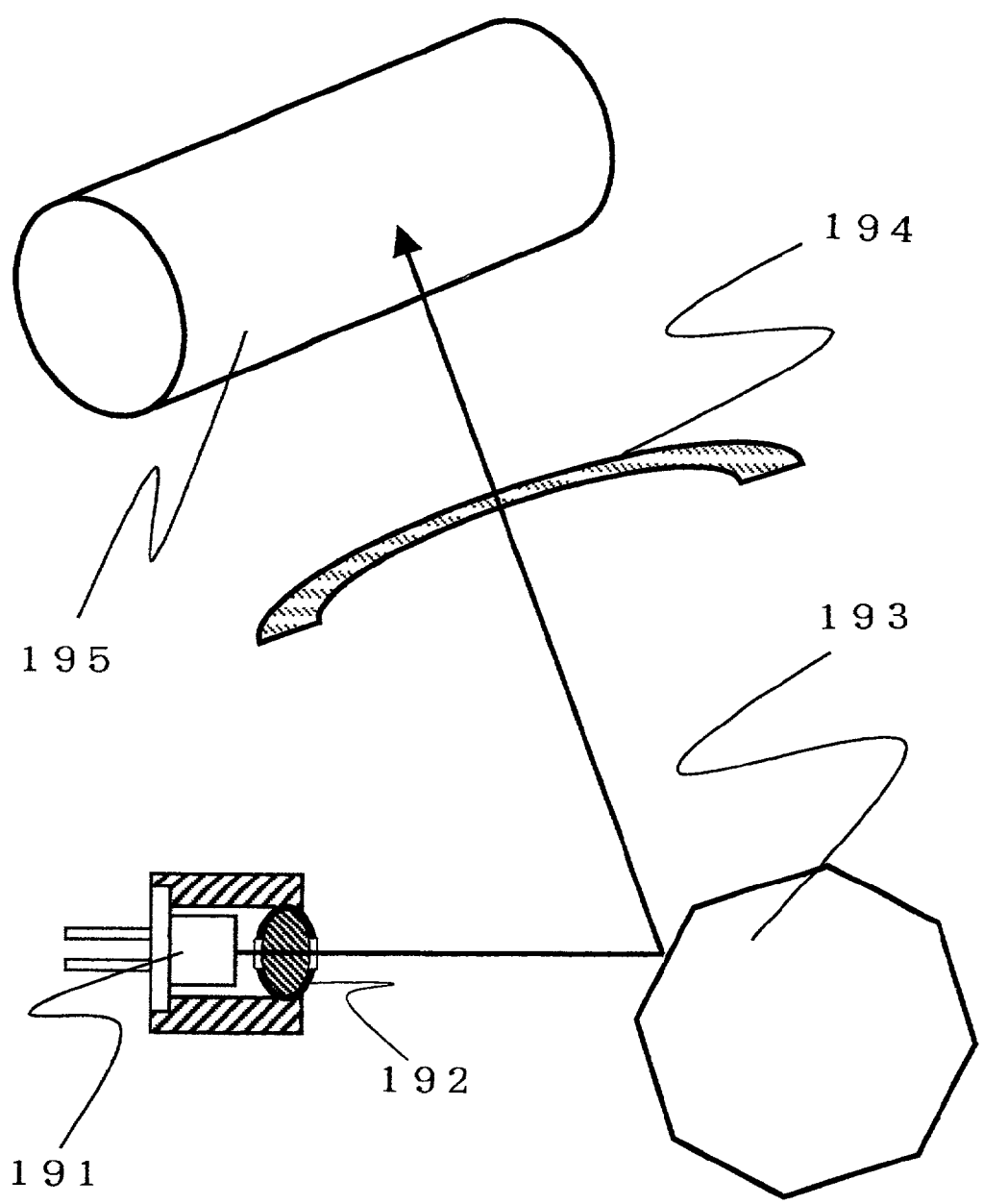
FIG. 17 is a structural drawing showing a laser beam printer optical system according to an embodiment of the present invention.

Furthermore, FIG. 17 is a structural drawing showing a laser beam printer optical system using the lens of the present invention. Light from a semiconductor laser 191 is emitted to a polygon mirror 193 through a lens 192, and drawing is performed on a photosensitive drum 195 through an Fθ lens 194. The lens 192 of the present invention permits lower cost of the optical system, thereby reducing the cost of the entire device.

As described above, the lens of the present invention has a configuration permitting visual discrimination between the inner region and outer region of the effective area of the lens. For example, regarding the lens of the present invention, a surface outside the effective area of the lens is a non-shiny surface. Also, regarding the lens of the present invention, the surface outside the effective area of the lens is a light-absorbing surface. Moreover, regarding the lens of the present invention, the surface outside the effective area of the lens is a scattering surface. Furthermore, regarding the lens of the present invention, the surface outside the effective area of the lens is a finely patterned surface. Additionally, regarding the lens of the present invention, the surface outside the effective area of the lens is a rough surface.

Also, in the lens manufacturing method of the present invention, surface treatment is performed on the lens so as to visually discriminate between the inner region and outer region of the effective area of the lens. For example, in the lens manufacturing method of the present invention, the surface treatment is performed by coating outside the effective area. Additionally, in the lens manufacturing method of the present invention, the surface treatment is performed by printing outside the effective area. Further, in the lens manufacturing method of the present invention, the surface treatment is performed by evaporating outside the effective area. Moreover, in the lens manufacturing method of the present invention, the surface treatment is performed by pressing outside the effective area.

Furthermore, the optical device of the present invention is characterized by using the above-mentioned optical lens. For instance, the optical pickup of the present invention is characterized by using the above-mentioned lens. Additionally, the optical communication component of the present invention is characterized by using the above-mentioned optical lens. Moreover, the optical sensor of the present invention is characterized by using the above-mentioned lens. Also, the laser beam printer of the present invention is characterized by using the above-mentioned lens.

As earlier mentioned, according to the lens of the present invention, working is performed such that the surface outside the effective area of the lens can be visually discriminated so as to reduce defects in a visual inspection, resulting in a larger yield and lower manufacturing cost.

Also, the optical device of the present invention can improve its capability with lower cost by using the optical lens of the present invention. For example, the optical pickup of the present invention can improve its capability with lower cost by using the optical lens of the present invention. Further, the optical communication component of the present invention can improve its capability with lower cost by using the optical lens of the present invention. Furthermore, the optical sensor of the present invention can improve its capability with lower cost by using the optical lens of the present invention.

As earlier mentioned, the present invention makes it possible to provide an optical lens allowing a worker to readily determine an installation surface of the lens, a manufacturing method of the optical lens, and an optical device using the optical lens.

Additionally, the present invention has an advantage in providing a lens, a lens manufacturing method, a lens manufacturing device, an optical device, an optical pickup device, an optical communication device, an optical sensor device, and a laser beam printer device that supply a high-quality lens with low manufacturing cost.

What is claimed is:

1. An optical lens, comprising a marking formed on a surface entirely outside a light transmitting effective area of said lens to distinguish between a surface and a back of said lens,
    wherein said marking is unevenly formed outside the effective area of said lens.

2. The optical lens as set forth in claim 1, wherein said lens is a coupling lens for optically coupling a light beam irradiated from a light source to an incident end face of an optical device.

3. The optical lens as set forth in claim 1, wherein said marking is made of a printed matter.

4. The optical lens as set forth in claim 1, wherein said marking is made of a coating matter.

5. The optical lens as set forth in claim 1, wherein the marking comprises a light-absorbing material.

6. The optical lens as set forth in claim 1, wherein the marking comprises a light-scattering material.

7. The optical lens as set forth in claim 1, wherein the marking comprises a rough surface.

8. The optical lens as set forth in claim 1, wherein the optical lens is 2 millimeters or smaller.

9. An optical lens, comprising a marking formed on a surface entirely outside a light transmitting effective area of said lens to distinguish between a surface and a back of said lens, wherein
    said lens surface has a coating film and said marking is formed by using said coating film, and
    said coating film is not provided entirely outside the effective area of said lens, and said marking refers to a part on which said coating film is not provided.

10. An optical device, comprising any one of optical lenses as set forth in claims 1, 2, 9, 3 and to 4.

11. The optical device as set forth in claim 10, wherein said optical device is an optical pickup device and said optical lens is used for condensing light on an optical disk, said optical device including a light source for emitting light and an optical element for detecting light reflected on said optical disk.

12. The optical device as set forth in claim 10, wherein said optical device is an optical communication component and said optical lens is used for condensing light, said optical device including a light source for emitting light and an optical fiber.

13. The optical device as set forth in claim 10, wherein said optical device is an optical sensor and said optical lens is used for condensing light, said optical device including an optical element for detecting light condensed by said optical lens.

14. The optical lens as set forth in claim 9, wherein said lens is a coupling lens for optically coupling a light beam irradiated from a light source to an incident end face of an optical device.

15. The optical lens as set forth in claim 9, wherein said marking is made of a printed matter.

16. The optical lens as set forth in claim 9, wherein said marking is made of a coating matter.

17. The optical lens as set forth in claim 9, wherein the marking comprises a light-absorbing material.

18. The optical lens as set forth in claim 9, wherein the marking comprises a light-scattering material.

19. The optical lens as set forth in claim 9, wherein the marking comprises a rough surface.

20. The optical lens as set forth in claim 9, wherein the optical lens is 2 millimeters or smaller.

21. A manufacturing method of an optical lens, comprising a step of entirely forming a marking on a surface outside a light transmitting effective area of said lens to distinguish between a surface and a back of said lens, wherein said lens is a coupling lens for optically coupling a light beam irradiated from a light source to an incident end face of an optical device, and said marking is unevenly formed outside the effective area of said lens by using a mold.

22. A manufacturing method of an optical lens, comprising a step of entirely forming a marking on a surface outside a light transmitting effective area of said lens to distinguish between a surface and a back of said lens, wherein said lens surface has a coating film and said marking is formed by using said coating film, and said coating film is not provided entirely outside the effective area of said lens, and said marking refers to a part on which said coating film is not provided.

23. The manufacturing method of the optical lens as set forth in claim 21 or 22, wherein said marking is formed by printing.

24. The manufacturing method of the optical lens as set forth in claim 21 or 22, wherein said marking is formed by coating.

* * * * *